United States Patent
Miyamoto et al.

(10) Patent No.: US 12,111,402 B2
(45) Date of Patent: Oct. 8, 2024

(54) POSITIONING ASSISTANCE APPARATUS, POSITIONING ASSISTANCE METHOD, AND COMPUTER-READABLE RECORDING MEDIUM

(71) Applicant: NEC Solution Innovators, Ltd., Tokyo (JP)

(72) Inventors: Ryo Miyamoto, Tokyo (JP); Maho Kashiwagi, Tokyo (JP); Yuka Kanda, Tokyo (JP)

(73) Assignee: NEC Solution Innovators, Ltd., Tokyo (JP)

(*) Notice: Subject to any disclaimer, the term of this patent is extended or adjusted under 35 U.S.C. 154(b) by 212 days.

(21) Appl. No.: 17/633,648

(22) PCT Filed: Aug. 20, 2020

(86) PCT No.: PCT/JP2020/031511
§ 371 (c)(1),
(2) Date: Feb. 8, 2022

(87) PCT Pub. No.: WO2021/044866
PCT Pub. Date: Mar. 11, 2021

(65) Prior Publication Data
US 2022/0317311 A1    Oct. 6, 2022

(30) Foreign Application Priority Data
Sep. 5, 2019 (JP) ................... 2019-162454

(51) Int. Cl.
*G01S 19/07* (2010.01)

(52) U.S. Cl.
CPC ................... *G01S 19/072* (2019.08)

(58) Field of Classification Search
CPC ................... G01S 19/07–074; G01S 19/40–41
See application file for complete search history.

(56) References Cited

U.S. PATENT DOCUMENTS

| | | | |
|---|---|---|---|
| 2018/0024248 A1* | 1/2018 | Orejas | G06N 3/08 |
| | | | 342/357.44 |
| 2020/0124737 A1* | 4/2020 | Hofmann | G01S 19/071 |

FOREIGN PATENT DOCUMENTS

| | | | |
|---|---|---|---|
| CN | 103455702 A | | 12/2013 |
| JP | 2009075035 A | * | 4/2009 |
| JP | 2011-080900 A | | 4/2011 |

(Continued)

OTHER PUBLICATIONS

English translation of Written opinion for PCT Application No. PCT/JP2020/031511, mailed on Oct. 27. 2020.

(Continued)

*Primary Examiner* — Bernarr E Gregory
*Assistant Examiner* — Hailey R Le

(57) ABSTRACT

A positioning assistance apparatus 1 that improves the positioning accuracy includes an estimation unit 2 that estimates a delay amount (ionosphere delay amount or a troposphere delay amount) using a model generated through machine learning (an ionosphere delay model or a troposphere delay model) and a degree-of-precision calculation unit 3 that calculates a degree of precision with respect to a delay amount (an ionosphere delay amount or a troposphere delay amount) calculated through positioning computation, using the estimated delay amount.

12 Claims, 8 Drawing Sheets

(56) References Cited

FOREIGN PATENT DOCUMENTS

| | | | |
|---|---|---|---|
| JP | 2011112576 A | * | 6/2011 |
| JP | 2012-137448 A | | 7/2012 |
| JP | 2014-206502 A | | 10/2014 |
| JP | 2018-159668 A | | 10/2018 |
| JP | 2018-205244 A | | 12/2018 |

OTHER PUBLICATIONS

International Search Report for PCT Application No. PCT/JP2020/031511, mailed on Oct. 27, 2020.

JP Office Action for JP Application No. 2021-543697, mailed on Nov. 8, 2022 with English Translation.

* cited by examiner

POSITIONING ASSISTANCE APPARATUS, POSITIONING ASSISTANCE METHOD, AND COMPUTER-READABLE RECORDING MEDIUM

This application is a National Stage Entry of PCT/JP2020/031511 filed on Aug. 20, 2020, which claims priority from Japanese Patent Application 2019-162454 filed on Sep. 5, 2019, the contents of all of which are incorporated herein by reference, in their entirety.

TECHNICAL FIELD

The technical field relates to a positioning assistance apparatus and a positioning assistance method for assisting satellite positioning, and in particular relates to a computer-readable recording medium on which a program for realizing the apparatus and method is recorded.

BACKGROUND ART

In order to accurately perform satellite positioning, error factors such as (1) satellite orbit error, (2) satellite clock error, (3) ionosphere delay, (4) tropospheric delay, (5) signal shielding, and (6) multipath need to be taken into consideration.

In view of this, techniques such as PPP (Precise Point Positioning) have been proposed. However, it is difficult to perform accurate satellite positioning when only information received from the satellite is used.

In recent years, in order to further improve the accuracy of satellite positioning, techniques such as MADOCA (Multi-GNSS (Global Navigation Satellite System) Advanced Demonstration tool for Orbit and Clock Analysis)-PPP have been proposed.

Specifically, (1) satellite orbit error and (2) satellite clock error are reduced using MADOCA correction information. (3) Ionosphere delay error and (4) troposphere delay error are reduced using local correction information. (5) Signal shielding and (6) multipath errors are reduced using radio waves transmitted from a high elevation angle satellite (quasi-zenith satellite, etc.).

As a related technique, Patent Document 1 discloses a positioning apparatus for improving the accuracy of satellite positioning. With the positioning apparatus of Patent Document 1, positioning computation processing is carried out using correction information obtained through a satellite channel and a terrestrial channel (global correction information and local correction information) and observation data generated based on a positioning signal transmitted from the satellite. In addition, when content of newly obtained correction information and content of correction information stored in advance (target satellites or information types) overlap, the positioning apparatus of Patent Document 1 calculates reliabilities thereof, and selects the information with a higher reliability.

LIST OF RELATED ART DOCUMENTS

Patent Document

Patent document 1: Japanese Patent Laid-Open Publication No. 2018-205244

SUMMARY

Technical Problems

However, the positioning apparatus disclosed in Patent Document 1 calculates a reliability using the distance between a local generation station and the positioning apparatus or a standard deviation for which positioning results of the local generation station are used as a population, in addition to a time for which local correction information has been held (freshness of information), and updates the local correction information in accordance with the calculated reliability, but does not improve the accuracy of an ionosphere delay amount or a troposphere delay amount.

An example object of the invention is to provide a positioning assistance apparatus, a positioning assistance method, and a computer-readable recording medium for improving the positioning accuracy.

Solution to the Problems

In order to achieve the aforementioned object, a positioning assistance apparatus according to an example aspect is a positioning assistance apparatus to be provided in a generation-side apparatus that generates local correction information, including:
a first estimation unit that estimates an ionosphere delay amount using an ionosphere delay model generated through machine learning; and
a first degree-of-precision calculation unit that calculates a first degree of precision with respect to an ionosphere delay amount calculated through positioning computation, using the estimated ionosphere delay amount.

In addition, in order to achieve the aforementioned object, a positioning assistance apparatus according to an example aspect is a positioning assistance apparatus to be provided in a use-side apparatus that uses local correction information, including:
a first delay accuracy calculation unit that calculates an accuracy of an ionosphere delay amount calculated through positioning computation, based on a first degree of precision calculated using the ionosphere delay amount and an ionosphere delay amount estimated using an ionosphere delay model generated through machine learning.

In addition, in order to achieve the aforementioned object, a positioning assistance method according to an example aspect is a positioning assistance method for a generation-side apparatus that generates local correction information, the method including:
estimating an ionosphere delay amount using an ionosphere delay model generated through machine learning; and
calculating a first degree of precision with respect to an ionosphere delay amount calculated through positioning computation, using the estimated ionosphere delay amount.

In addition, in order to achieve the aforementioned object, a positioning assistance method according to an example aspect is a positioning assistance method for a use-side apparatus that uses local correction information, the method including:
calculating an accuracy of an ionosphere delay amount calculated through positioning computation, based on a first degree of precision calculated using the ionosphere delay amount and an ionosphere delay amount estimated using an ionosphere delay model generated through machine learning.

In addition, in order to achieve the aforementioned object, a computer-readable recording medium according to an example aspect includes a program recorded thereon, the program including instructions that cause a computer of a generation-side apparatus that generates local correction information to carry out:

estimating an ionosphere delay amount using an ionosphere delay model generated through machine learning; and calculating a first degree of precision with respect to an ionosphere delay amount calculated through positioning computation, using the estimated ionosphere delay amount.

Furthermore, in order to achieve the aforementioned object, a computer-readable recording medium according to an example aspect includes a program recorded thereon, the program including instructions that cause a computer of a use-side apparatus that uses local correction information to carry out:

calculating an accuracy of an ionosphere delay amount calculated through positioning computation, based on a first degree of precision calculated using the ionosphere delay amount and an ionosphere delay amount estimated using an ionosphere delay model generated through machine learning.

Advantageous Effects of the Invention

As described above, according to the invention, it is possible to improve the positioning accuracy.

EXAMPLE EMBODIMENT

First Example Embodiment

Figure 1:
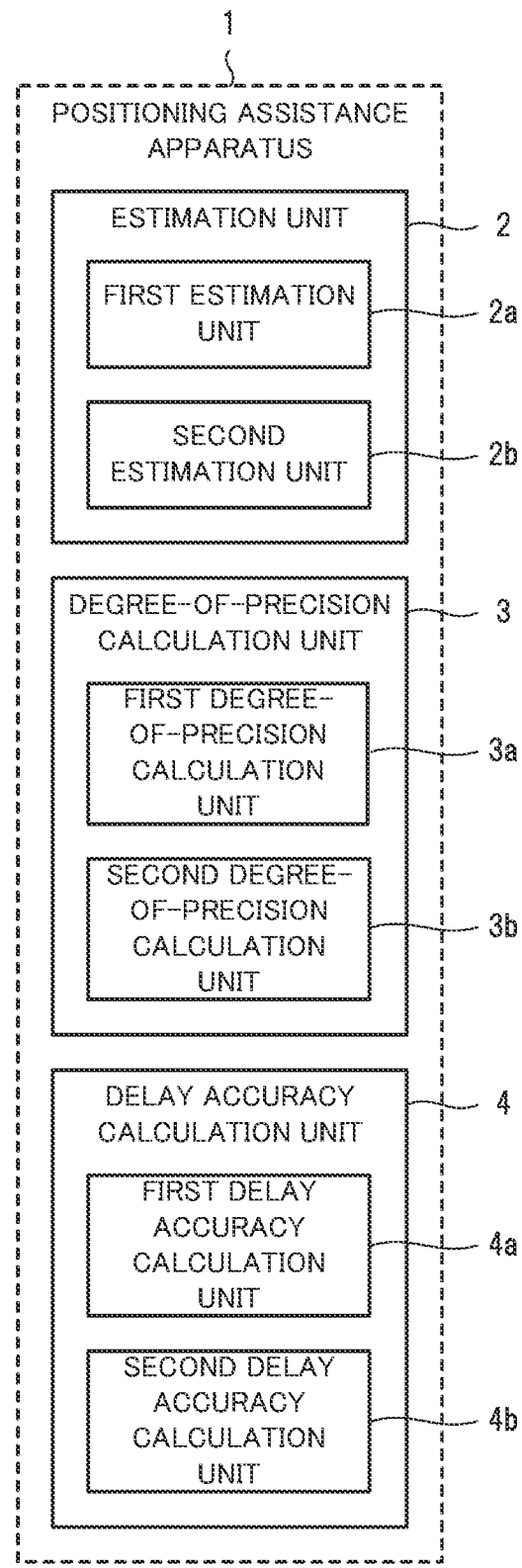
FIG. 1 is a diagram for describing an example of a positioning assistance apparatus.

The following describes a first example embodiment with reference to FIGS. 1 to 4.
[Apparatus Configuration]
First, a configuration of a positioning assistance apparatus 1 according to the first example embodiment will be described with reference to FIG. 1. FIG. 1 is a diagram for describing an example of the positioning assistance apparatus.

The positioning assistance apparatus shown in FIG. 1 is an apparatus for improving the positioning accuracy. In addition, as shown in FIG. 1, the positioning assistance apparatus includes an estimation unit 2, a degree-of-precision calculation unit 3, and a delay accuracy calculation unit 4.

Of these, the estimation unit 2 includes a first estimation unit 2a that estimates an ionosphere delay amount using an ionosphere delay model indicating an ionosphere delay amount generated through machine learning. In addition, the estimation unit 2 includes a second estimation unit 2b that estimates a troposphere delay amount using a troposphere delay model indicating a troposphere delay amount generated through machine learning.

The ionosphere delay model is a model for performing machine learning using, as input, data collected in past positioning, and outputs an ionosphere delay amount, for example. In addition, the troposphere delay model is a model for performing machine learning using, as input, data collected in past positioning, and outputs a troposphere delay amount, for example. Examples of machine learning include leaning that uses regression analysis, deep learning, and the like.

The degree-of-precision calculation unit 3 includes a first degree-of-precision calculation unit 3a that calculates a first degree of precision with respect to an ionosphere delay amount calculated through positioning computation, using an estimated ionosphere delay amount. In addition, the degree-of-precision calculation unit 3 includes a second degree-of-precision calculation unit 3b that calculates a second degree of precision with respect to a troposphere delay amount calculated through positioning computation, using an estimated troposphere delay amount.

A value obtained by obtaining a difference between an estimated ionosphere delay amount B1 and an ionosphere delay amount A1 calculated through positioning computation, and dividing the absolute value of the difference by the estimated ionosphere delay amount B1, for example, is conceivable as a first degree of precision. In addition, a value obtained by obtaining a difference between an estimated troposphere delay amount B2 and a troposphere delay amount A2 calculated through positioning computation, and dividing the absolute value of the difference by the estimated troposphere delay amount B2, for example, is conceivable as a second degree of precision.

The delay accuracy calculation unit 4 includes a first delay accuracy calculation unit 4a that calculates an accuracy of the ionosphere delay amount, using the first degree of precision. In addition, the delay accuracy calculation unit 4 includes a second delay accuracy calculation unit 4b that calculates an accuracy of the troposphere delay amount, using the second degree of precision.

The accuracy of the ionosphere delay amount may be a value that is indicated using a standard deviation of ionosphere delay amounts and a first degree of precision, for example. In addition, the accuracy of the troposphere delay amount may be a value that is indicated using a standard deviation of troposphere delay amounts and a second degree of precision, for example.

In this manner, in the first example embodiment, it is possible to further improve the accuracy of the ionosphere delay amount and the troposphere delay amount by calculating the preciseness of the accuracy of the ionosphere delay amount and the troposphere delay calculated at the time of positioning computation, respectively using an estimated ionosphere delay amount and an estimated troposphere delay amount. As a result, it is possible to improve the positioning accuracy.

[System Configuration]

Figure 2:
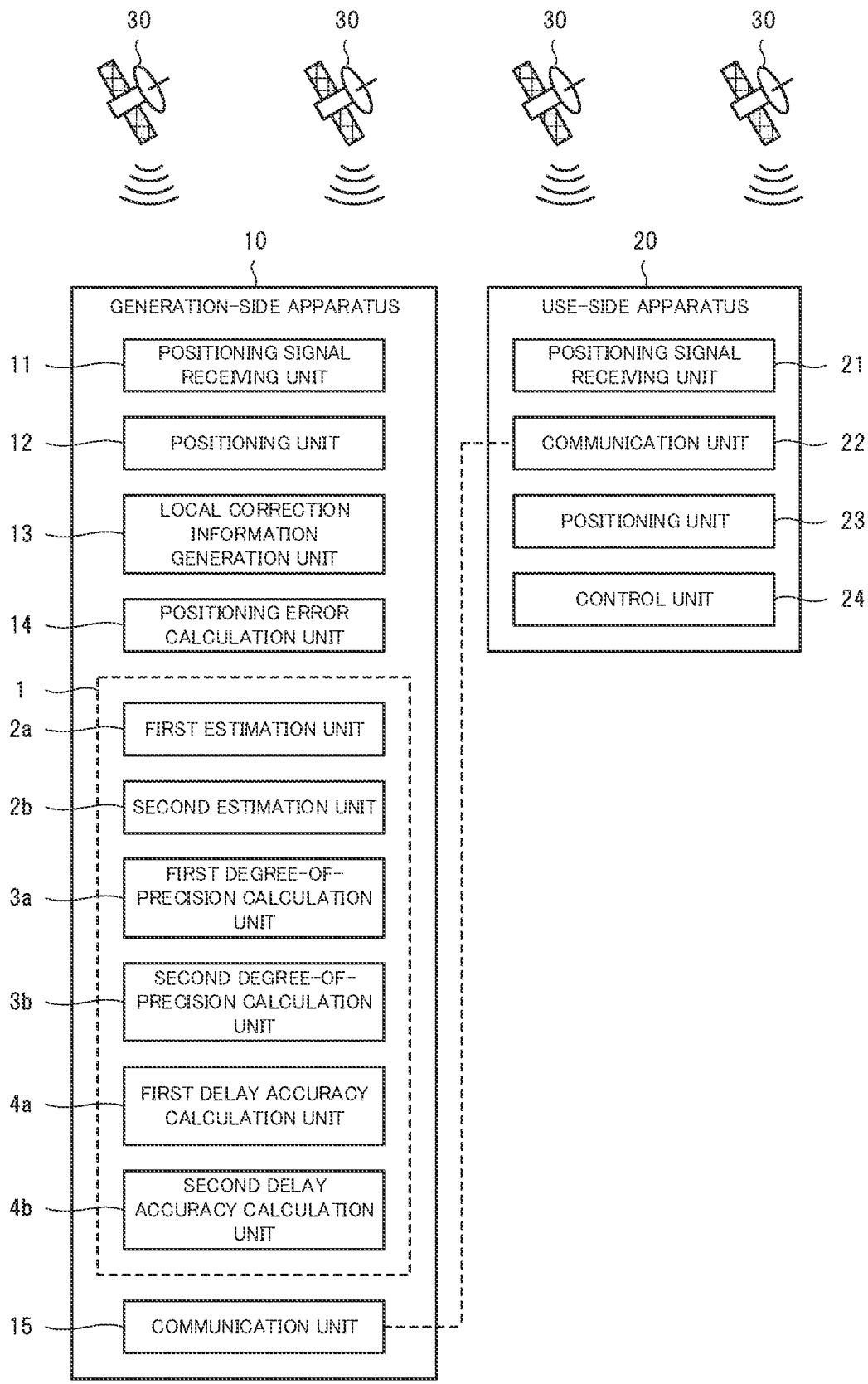
FIG. 2 is a diagram for describing an example of a system that includes positioning assistance apparatuses.

Next, the configuration of the positioning assistance apparatus 1 according to the first example embodiment will be described in more detail with reference to FIG. 2. FIG. 2 is a diagram for describing an example of a system that includes positioning assistance apparatuses.

As shown in FIG. 2, the system according to the first example embodiment includes a generation-side apparatus 10 (generation station) and a use-side apparatus 20. In addition, the generation-side apparatus 10 and the use-side apparatus 20 receive radio waves from positioning satellites 30.

The generation-side apparatus 10 includes the estimation unit 2 (the first estimation unit 2a and the second estimation unit 2b), the degree-of-precision calculation unit 3 (the first degree-of-precision calculation unit 3a and the second degree-of-precision calculation unit 3b), the delay accuracy calculation unit 4 (the first delay accuracy calculation unit 4a and the second delay accuracy calculation unit 4b), a positioning signal receiving unit 11, a positioning unit 12, a local correction information generation unit 13, a positioning error calculation unit 14, and a communication unit 15. In addition, the use-side apparatus 20 includes a positioning signal receiving unit 21, a communication unit 22, a positioning unit 23, and a control unit 24.

The system will be described.

Examples of the system include a satellite positioning system and the like. A GNSS (Global Navigation Satellite System), for example, is conceivable as the satellite positioning system. Specifically, in the satellite positioning system, the generation-side apparatus 10 and the use-side apparatus 20 calculate present positions thereof based on positioning signals transmitted from the plurality of positioning satellites 30 shown in FIG. 2.

The generation-side apparatus 10 receives positioning signals from the positioning satellites 30, and generates local correction information that is valid in a service area. The generation-side apparatus 10 then transmits the generated local correction information to the use-side apparatus 20. The generation-side apparatus 10 is installed on the ground, for example.

The service area is a region that is set based on the position at which the generation-side apparatus 10 is installed, for example.

The use-side apparatus 20 receives positioning signals from the positioning satellites 30, demodulates the received positioning signals, and generates observation data. In addition, the use-side apparatus 20 receives local correction information from the generation-side apparatus 10. The use-side apparatus 20 then calculates a present position thereof based on the generated observation data and the local correction information that is valid in the service area. Furthermore, the use-side apparatus 20 provides information indicating the calculated present position to various applications.

The use-side apparatus 20 is mounted in a mobile object or the like. Examples of the mobile object include vehicles, flight vehicles, vessels, mobile devices, and the like. A navigation system, an automated driving system, or the like is conceivable as an application.

Each positioning satellite 30 revolves on a predetermined satellite orbit in a predetermined orbit period. The positioning satellite 30 transmits a positioning signal obtained by phase-modulating data indicating a transmission time and the like.

The generation-side apparatus 10 that generates local correction information will be described.

The positioning signal receiving unit 11 receives positioning signals transmitted from the positioning satellites 30, via a monitor apparatus for monitoring radio waves from the positioning satellites 30 disposed in the vicinity of the generation-side apparatus 10, demodulate the received positioning signals, and generates observation data. Specifically, the positioning signal receiving unit 11 includes an antenna that receives positioning signals, a circuit for demodulating positioning signals, and the like.

Data such as identification information for identifying positioning satellites, observation times at which positioning signals used for generating observation data were received, a Doppler shift amount indicating the difference between a carrier frequency and a received frequency caused by the Doppler effect, satellite coordinates indicating the present positions on the satellite orbits of the positioning satellites 30, a pseudo distance indicating the difference between a time at which a positioning signal was transmitted from each positioning satellite 30 and a time at which the positioning signal was received by the positioning signal receiving unit 11, and the carrier phase is conceivable as the observation data.

The positioning unit 12 calculates position coordinates of the generation-side apparatus 10 using the observation data. PPP-AR, MADOCA-PPP, or the like can be used as a positioning method.

The local correction information generation unit 13 generates local correction information for each positioning satellite 30 based on the observation data, and stores the generated local correction information in a storage unit provided in the local correction information generation unit 13 (not illustrated in FIG. 2). Note that, regarding the storage unit, the information may be stored in a storage device such as a database provided inside or outside the generation-side apparatus 10.

Information such as identification numbers for identifying satellites, a generation time at which local correction information was generated, position coordinates of the generation-side apparatus 10, a position coordinate deviation that indicates variation of position coordinates during a certain period of time, ionosphere correction information (information such as the ionosphere delay amount A1 or the standard deviation of ionosphere delay amounts), and troposphere correction information (information such as the troposphere delay amount A2 or the standard deviation of troposphere delay amounts) is stored as the local correction information.

The positioning error calculation unit 14 calculates a positioning error using position coordinates (reference position) indicating the position of the generation-side apparatus 10 and position coordinates (estimated position) of the generation-side apparatus 10 estimated based on positioning signals received from satellites. The reference position refers to the position coordinates of the generation-side apparatus 10 measured in advance.

The positioning error calculation unit 14 calculates the distance between two points in a three-dimensional space (between the reference position and the estimated position), for example, and regards the distance as a positioning error.

The first estimation unit 2a applies a plurality of pieces of data obtained at a preset interval, to the ionosphere delay model, and estimates an ionosphere delay amount B1. Specifically, the first estimation unit 2a first obtains data such as a date and time Dt, a temperature T, a humidity H, and a positioning error L in real time at a preset interval.

Next, the first estimation unit 2a applies the obtained data to the ionosphere delay model, and outputs the estimated ionosphere delay amount B1. A relational expression such as that indicated by Formula 1 is conceivable as the ionosphere delay model. Note that there is no limitation to Formula 1.

$$B1 = a1 \times L + a2 \times Dt + a3 \times T + a4 \times H + \ldots + b \quad \text{[Formula 1]}$$

B1: ionosphere delay amount estimated using the ionosphere delay model
a1: coefficient corresponding to positioning error
L: positioning error calculated by the positioning error calculation unit 14
a2: coefficient corresponding to date and time
Dt: date and time when positioning was performed
a3: coefficient corresponding to temperature
T: temperature obtained from outside via the communication unit 15
a4: coefficient corresponding to humidity
H: humidity obtained from outside via the communication unit 15
b: intercept The second estimation unit 2b applies a plurality of pieces of data obtained at a preset interval, to the troposphere delay model, and estimates the troposphere delay amount B2. Specifically, the second estimation unit 2b first obtains data such as date and time Dt, the temperature T, the humidity H, and the positioning error L, in real time at a preset interval.

Next, the second estimation unit 2b applies the obtained data to the troposphere delay model, and outputs the estimated troposphere delay amount B2. A relational expression such as that indicated by Formula 2 is conceivable as the troposphere delay model. Note that there is no limitation to Formula 2.

$$B2 = c1 \times L + c2 \times Dt + c3 \times T + c4 \times H + \ldots + d \quad \text{(Formula 2)}$$

B2: troposphere delay amount estimated using the troposphere delay model
c1: coefficient corresponding to positioning error
L: positioning error calculated by the positioning error calculation unit 14
c2: coefficient corresponding to date and time
Dt: date and time when positioning was performed
c3: coefficient corresponding to temperature
T: temperature obtained from outside via the communication unit 15
c4: coefficient corresponding to humidity
H: humidity obtained from outside via the communication unit 15
d: intercept The first degree-of-precision calculation unit 3a calculates a first degree of precision with respect to the ionosphere delay amount A1 calculated through positioning computation, using the estimated ionosphere delay amount B1 and the ionosphere delay amount A1. Specifically, the degree-of-precision calculation unit 3a calculates a first degree of precision as indicated by Formula 3. Note that there is no limitation to Formula 3.

$$Re1 = |B1 - A1|/B1 \quad \text{(Formula 3)}$$

Re1: degree of precision (first degree of precision) with respect to the ionosphere delay amount A1 of local correction information The second degree-of-precision calculation unit 3b calculates a second degree of precision with respect to the troposphere delay amount A2 calculated through positioning computation, using the estimated troposphere delay amount B2 and the troposphere delay amount A2. Specifically, the degree-of-precision calculation unit 3b calculates a second degree of precision as indicated by Formula 4. Note that there is no limitation to Formula 4.

$$Re2 = |B2 - A2|/B2 \quad \text{(Formula 4)}$$

Re2: degree of precision (second degree of precision) of the ionosphere delay amount A2 of local correction information The first delay accuracy calculation unit 4a calculates an accuracy of the ionosphere delay amount using the first degree of precision. Specifically, the first delay accuracy calculation unit 4a calculates an accuracy of the ionosphere delay amount using the standard deviation of ionosphere delay amounts and the first degree of precision. The accuracy of the ionosphere delay amount is conceivably calculated as indicated by Formula 5, for example.

$$Ac1 = Sd1 \times Re1 \quad \text{(Formula 5)}$$

Ac1: accuracy of ionosphere delay amount
Sd1: standard deviation of ionosphere delay amounts
Re1: first degree of precision The second delay accuracy calculation unit 4b calculates an accuracy of the troposphere delay amount using the second degree of precision. Specifically, the second delay accuracy calculation unit 4b calculates an accuracy of the troposphere delay amount using the standard deviation of troposphere delay amounts and the second degree of precision. The accuracy of the troposphere delay amount is conceivably calculated as indicated by Formula 6, for example.

$$Ac2 = Sd2 \times Re2 \quad \text{(Formula 6)}$$

Ac2: accuracy of troposphere delay amount
Sd2: standard deviation of troposphere delay amounts
Re2: second degree of precision Note that the above-described accuracies of the ionosphere delay amount and troposphere delay amount will be described using three examples. In (1), when the standard deviation is 0.28 and the degree of precision is 0.22, then the accuracy is 0.062. In (2), when the standard deviation is 2.50 and the degree of precision is 0.30, then the accuracy is 0.750. In (3), when the standard deviation is 0.77 and the degree of precision is 1.20, then the accuracy is 0.924.

In the case of (1), it can be seen that both the standard deviation and degree of precision take small values, and thus the accuracy of the delay amount is high. However, in the case of (2) (3), one of the standard deviation and the degree of precision is a larger value, and thus it can be seen that the accuracy is not high. It is possible to calculate an accuracy of the delay amount in more detail by combining the standard deviation and the degree of precision instead of using only the standard deviation as is conventional.

The communication unit 15 transmits the local correction information, the accuracy of the ionosphere delay amount, and the accuracy of the troposphere delay amount to the communication unit 22 of the use-side apparatus 20. Specifically, the communication unit 15 is a communication apparatus that performs communication such as wired or wireless communication.

The use-side apparatus 20 that uses the local correction information will be described.

The positioning signal receiving unit 21 receives positioning signals transmitted from the positioning satellites 30, demodulates the received positioning signals, and generates observation data. Specifically, the positioning signal receiving unit 21 includes an antenna that receives positioning signals, a circuit for demodulating positioning signals, and the like.

The communication unit 22 receives the local correction information, the accuracy of the ionosphere delay amount, and the accuracy of the troposphere delay amount from the communication unit 15 of the generation-side apparatus 10. Specifically, the communication unit 22 is a communication apparatus that performs communication such as wired or wireless communication.

The positioning unit 23 calculates position coordinates of the use-side apparatus 20 using the observation data, the local correction information, the accuracy of the ionosphere delay amount, and the accuracy of the troposphere delay amount. PPP-AR, MADOCA-PPP, and the like can be used as a positioning method.

The control unit 24 controls an apparatus (for example, a vehicle, a flight vehicle, a vessel, or a mobile device) in which the use-side apparatus 20 is mounted or an application (for example, a navigation system) installed in the use-side apparatus 20, using the position coordinates calculated by the use-side apparatus 20. Specifically, the control unit 24 is a circuit that includes a processor and the like.

[Apparatus Operations]

Figure 3:
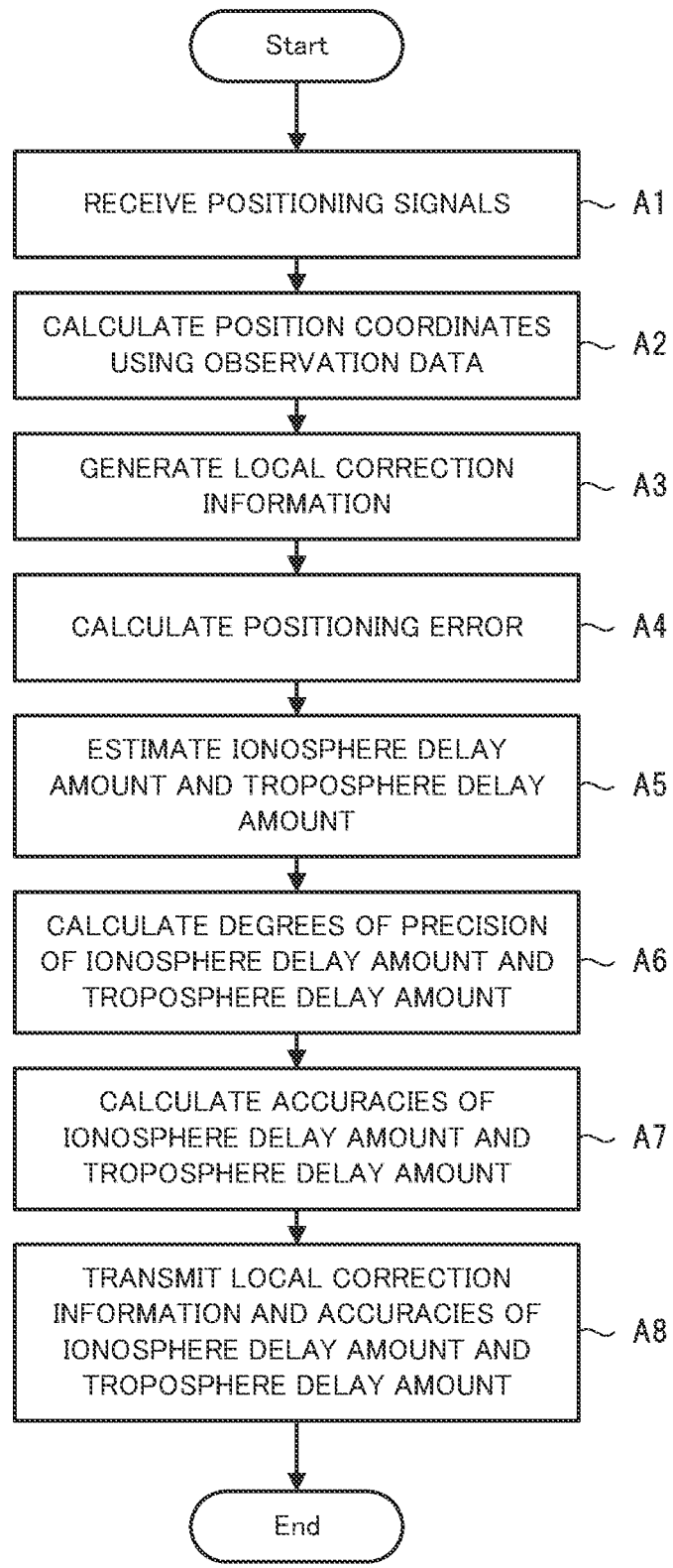
FIG. 3 is a diagram for describing an example of operations of a positioning assistance apparatus of a generation-side apparatus.
Figure 4:
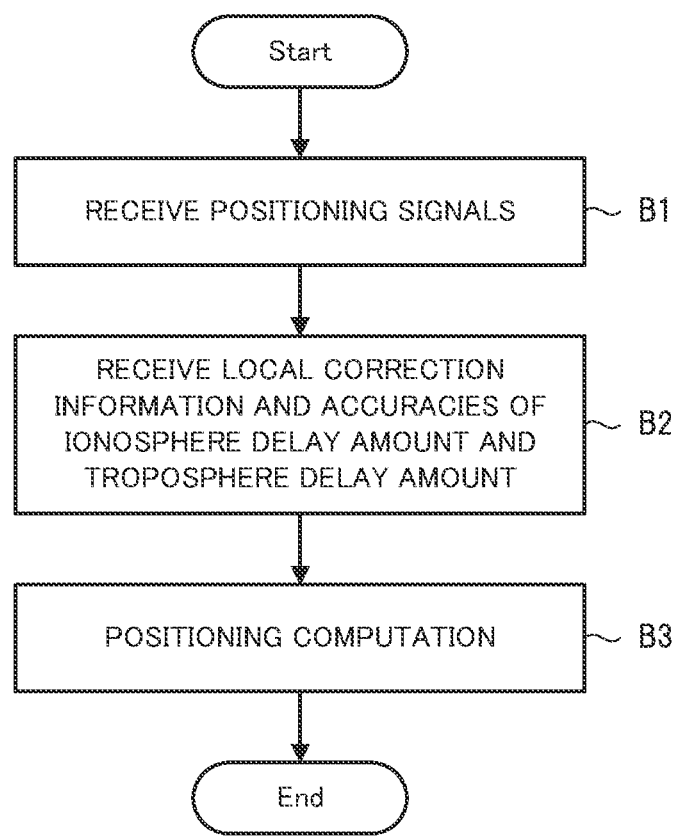
FIG. 4 is a diagram for describing an example of operations of a positioning assistance apparatus of a use-side apparatus.

Next, operations of the positioning assistance apparatuses according to first example embodiment will be described with reference to drawings. FIG. 3 is a diagram for describing an example of operations of the positioning assistance apparatus of the generation-side apparatus. FIG. 4 is a diagram for describing an example of operations of the positioning assistance apparatus of the use-side apparatus. In the following description, FIG. 2 will be referred to as appropriate. In addition, in the first example embodiment, a positioning assistance method is carried out by operating the positioning assistance apparatuses. Thus, description of the positioning assistance method according to the first example embodiment is replaced by the following description of operations of the positioning assistance apparatuses.

Operations of the generation-side apparatus will be described with reference to FIG. 3.

First, the positioning signal receiving unit 11 receives positioning signals transmitted from the positioning satellites 30, via the monitor apparatus for monitoring radio waves from the positioning satellites 30 disposed in the vicinity of the generation-side apparatus 10, demodulates the received positioning signals, and generates observation data (step A1).

Next, the positioning unit 12 calculates position coordinates of the generation-side apparatus 10 using the observation data (step A2). The local correction information generation unit 13 then generates local correction information for each positioning satellite 30 based on the observation data, and stores the generated local correction information in the storage unit (step A3).

Next, the positioning error calculation unit 14 calculates a positioning error using the position coordinates (reference position) indicating the precise position of the generation-side apparatus 10 and the position coordinates (estimated position) of the generation-side apparatus 10 estimated based on the positioning signals received from satellites (step A4). The positioning error calculation unit 14 calculates the distance between two points in a three-dimensional space (between the reference position and the estimated position), and regards the distance as a positioning error, for example.

Next, the first estimation unit 2a applies a plurality of pieces of data obtained at a preset interval, to the ionosphere delay model, and estimates the ionosphere delay amount B1 (step A5). In addition, the second estimation unit 2b applies a plurality of pieces of data obtained at a preset interval, to the troposphere delay model, and estimates the troposphere delay amount B2 (step A5).

Specifically, in step A5, the first estimation unit 2a first obtains data such as date and time Dt, the temperature T, the humidity H, and the positioning error L in real time at a preset interval. The first estimation unit 2a then applies the obtained data to the ionosphere delay model, and outputs the estimated ionosphere delay amount B1. A relational expression such as that indicated by Formula 1 is conceivable as the ionosphere delay model.

In addition, specifically, in step A5, the second estimation unit 2b first obtains data such as the date and time Dt, the temperature T, the humidity H, and the positioning error L in real time at a preset interval. The second estimation unit 2b then applies the obtained data to the troposphere delay model, and outputs the estimated troposphere delay amount B2. A relational expression such as that indicated by Formula 2 is conceivable as the troposphere delay model.

Next, the first degree-of-precision calculation unit 3a calculates a first degree of precision with respect to the ionosphere delay amount A1 calculated through positioning computation, using the estimated ionosphere delay amount B1 and the ionosphere delay amount A1 (step A6). In addition, the second degree-of-precision calculation unit 3b calculates a second degree of precision with respect to the troposphere delay amount A2 calculated through positioning computation, using the estimated troposphere delay amount B2 and the troposphere delay amount A2 (step A6).

Specifically, in step A6, the first degree-of-precision calculation unit 3a conceivably calculates the first degree of precision as indicated by Formula 3. In addition, in step A6, the second degree-of-precision calculation unit 3b conceivably calculates the second degree of precision as indicated by Formula 4.

The first delay accuracy calculation unit 4a calculates an accuracy of the ionosphere delay amount using the first degree of precision. Specifically, the first delay accuracy calculation unit 4a calculates an accuracy of the ionosphere delay amount using the standard deviation of ionosphere delay amounts and the first degree of precision (step A7). The accuracy of the ionosphere delay amount is conceivably calculated as indicated by Formula 5, for example.

In addition, the second delay accuracy calculation unit 4b calculates an accuracy of the troposphere delay amount using the second degree of precision. Specifically, the second delay accuracy calculation unit 4b calculates an accuracy of the troposphere delay amount using the standard deviation of troposphere delay amounts and the second degree of precision (step A7). The accuracy of the troposphere delay amount is conceivably calculated as indicated by Formula 6, for example.

The communication unit 15 transmits the local correction information, the accuracy of the ionosphere delay amount, and the accuracy of the troposphere delay amount to the communication unit 22 of the use-side apparatus 20 (step A8).

Operations of the use-side apparatus will be described with reference to FIG. 4.

First, the positioning signal receiving unit 21 receives positioning signals transmitted from the positioning satellites 30, demodulates the received positioning signals, and generates observation data (step B1).

Next, the positioning unit 23 receives the local correction information, the accuracy of the ionosphere delay amount, and the accuracy of the troposphere delay amount from the generation-side apparatus 10 via the communication unit 22 (step B2).

The positioning unit 23 calculates position coordinates of the use-side apparatus 20 using the observation data, the local correction information, the accuracy of the ionosphere delay amount, and the accuracy of the troposphere delay amount (step B3).

Next, the control unit 24 controls an apparatus in which the use-side apparatus 20 is mounted (for example, a vehicle, a flight vehicle, a vessel, or a mobile device) or an application installed in the use-side apparatus 20 (for example, a navigation system), using the position coordinates calculated by the use-side apparatus 20.

[Effects in Example Embodiment]

As described above, according to the first example embodiment, it is possible to further improve the accuracy of an ionosphere delay amount or a troposphere delay amount by calculating the preciseness of accuracy of ionosphere delay amount or troposphere delay calculated at the time of positioning computation, using an estimated ionosphere delay amount or troposphere delay amount. As a result, it is possible to improve the positioning accuracy.

[Program]

A program according to the first example embodiment may be a program for causing a generation-side computer to execute steps A1 to A8 shown in FIG. 3. In addition, the program according to the first example embodiment may be a program for causing a use-side computer to execute steps B1 to B3 shown in FIG. 4.

It is possible to realize the generation-side or use-side positioning assistance apparatus and the positioning assistance method according to the first example embodiment by installing these programs onto corresponding computers, and executing the programs. In this case, the processor of the generation-side computer functions as the positioning unit 12, the local correction information generation unit 13, the positioning error calculation unit 14, the first estimation unit 2a, the second estimation unit 2b, the first degree-of-precision calculation unit 3a, the second degree-of-precision calculation unit 3b, the first delay accuracy calculation unit 4a, and the second delay accuracy calculation unit 4b, and performs processing. In addition, the processor of the user-side computer functions as the positioning unit 23 and the control unit 24, and performs processing.

In addition, the program according to the first example embodiment may also be executed by a computer system constituted by a plurality of computers. Each generation-side computer may function as one of the positioning unit 12, the local correction information generation unit 13, the positioning error calculation unit 14, the first estimation unit 2a, the second estimation unit 2b, the first degree-of-precision calculation unit 3a, the second degree-of-precision calculation unit 3b, the first delay accuracy calculation unit 4a, and the second delay accuracy calculation unit 4b, for example. Each use-side computer may function as one of the positioning unit 23 and the control unit 24, for example.

Second Example Embodiment

A second example embodiment will be described below with reference to FIGS. 5 to 7.

[System Configuration]

Next, the configuration of positioning assistance apparatuses according to the second example embodiment will be described in greater detail with reference to FIG. 5. FIG. 5 is a diagram for describing an example of a system that includes the positioning assistance apparatuses.

Figure 5:
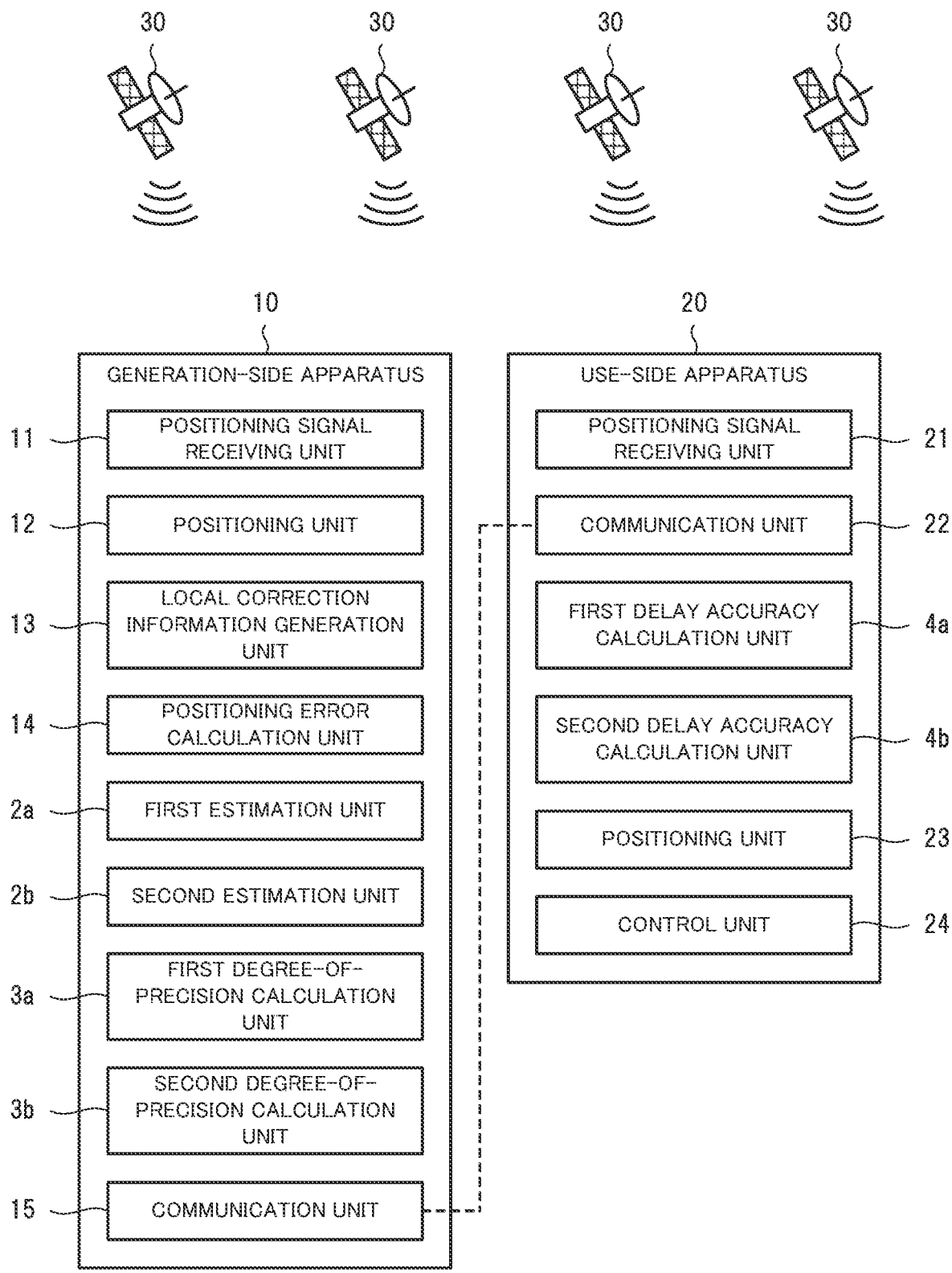
FIG. 5 is a diagram for describing an example of a system that includes positioning assistance apparatuses.

As shown in FIG. 5, the system according to the second example embodiment includes the generation-side apparatus 10 (generation station) and the use-side apparatus 20. The generation-side apparatus 10 includes the estimation unit 2 (the first estimation unit 2a and the second estimation unit 2b), the degree-of-precision calculation unit 3 (the first degree-of-precision calculation unit 3a and the second degree-of-precision calculation unit 3b), the positioning signal receiving unit 11, the positioning unit 12, the local correction information generation unit 13, the positioning error calculation unit 14, and the communication unit 15. In addition, the use-side apparatus 20 includes the positioning signal receiving unit 21, the communication unit 22, the positioning unit 23, the delay accuracy calculation unit 4 (the first delay accuracy calculation unit 4a and the second delay accuracy calculation unit 4b), and the control unit 24.

The generation-side apparatus 10 that generates local correction information will be described.

Operations of the positioning signal receiving unit 11, the positioning unit 12, the local correction information generation unit 13, the positioning error calculation unit 14, the estimation unit 2 (the first estimation unit 2a and the second estimation unit 2b), and the degree-of-precision calculation unit 3 (the first degree-of-precision calculation unit 3a and the second degree-of-precision calculation unit 3b) according to the second example embodiment are the same as those of the first example embodiment, and thus a description thereof is omitted.

The communication unit 15 transmits local correction information, a first degree of precision, and a second degree of precision to the communication unit 22 of the use-side apparatus 20.

The use-side apparatus 20 that uses local correction information will be described.

Operations of the positioning signal receiving unit 21, the positioning unit 23, and the control unit 24 according to the second example embodiment are the same as those of the first example embodiment, and thus a description of the positioning signal receiving unit 21, the positioning unit 23, and the control unit 24 is omitted.

The communication unit 22 receives the local correction information, the first degree of precision, and the second degree of precision from the communication unit 15 of the generation-side apparatus 10.

The delay accuracy calculation unit 4a calculates an accuracy of an ionosphere delay amount using the first degree of precision. Specifically, the delay accuracy calculation unit 4a calculates an accuracy of an ionosphere delay amount using the standard deviation of ionosphere delay amounts and the first degree of precision. The accuracy of the ionosphere delay amount is conceivably calculated as indicated by Formula 5, for example.

The second delay accuracy calculation unit 4b calculates an accuracy of a troposphere delay amount using the second degree of precision. Specifically, the second delay accuracy calculation unit 4b calculates an accuracy of a troposphere delay amount using the standard deviation of troposphere delay amounts and the second degree of precision. The accuracy of the troposphere delay amount is conceivably calculated as indicated by Formula 6, for example.

[Apparatus Configuration]

Next, operations of the positioning assistance apparatuses according to the second example embodiment will be described with reference to drawings. FIG. 6 is a diagram for describing an example of operations of the positioning assistance apparatus of the generation-side apparatus. FIG. 7 is a diagram for describing an example of operations of the positioning assistance apparatus of the use-side apparatus. In the following description, FIG. 5 will be referred to as appropriate. In addition, in the second example embodiment, the positioning assistance method is carried out by operating the positioning assistance apparatuses. Thus, a description of the positioning assistance method according to the second example embodiment is replaced with the following description of operations of the positioning assistance apparatuses.

Operations of the generation-side apparatus will be described with reference to FIG. 6.

First, the generation-side apparatus 10 executes the processing in steps A1 to A6 and C1. Steps A1 to A6 shown in FIG. 6 have been described in the first example embodiment, and a description thereof is omitted.

The communication unit 15 transmits local correction information, a first degree of precision, and a second degree of precision to the communication unit 22 of the use-side apparatus 20 (step C1).

Operation of the use-side apparatus will be described with reference to FIG. 7.

First, the positioning signal receiving unit 21 receives positioning signals transmitted from the positioning satellites 30, demodulates the received positioning signals, and generates observation data (step B1).

The communication unit 22 receives local correction information, a first degree of precision, and a second degree of precision from the communication unit 15 of the generation-side apparatus 10 (step D1).

Next, the delay accuracy calculation unit 4a calculates an accuracy of an ionosphere delay amount using the first degree of precision (step D2). In addition, the second delay accuracy calculation unit 4b calculates an accuracy of a troposphere delay amount using the second degree of precision (step D2).

Specifically, in step D2, the first delay accuracy calculation unit 4a calculates an accuracy of an ionosphere delay amount using the standard deviation of ionosphere delay amounts and the first degree of precision. The accuracy of the ionosphere delay amount is conceivably calculated as indicated by Formula 5, for example. In addition, in step D2, the second delay accuracy calculation unit 4b calculates an accuracy of a troposphere delay amount using the standard deviation of troposphere delay amounts and the second degree of precision. The accuracy of the troposphere delay amount is conceivably calculated as indicated by Formula 6, for example. The positioning unit 23 then calculates the position coordinates of the use-side apparatus 20 using the observation data, the local correction information, the accuracy of the ionosphere delay amount, and the accuracy of the troposphere delay amount (step B3).

[Effects in Second Example Embodiment]

As described above, according to the second example embodiment, it is possible to further improve the accuracy of an ionosphere delay amount and a troposphere delay amount calculated at the time of positioning computation, by calculating the preciseness of the accuracy of the ionosphere delay amount and the troposphere delay respectively using an estimated ionosphere delay amount and an estimated troposphere delay amount. As a result, it is possible to improve the positioning accuracy.

[Program]

Figure 6:
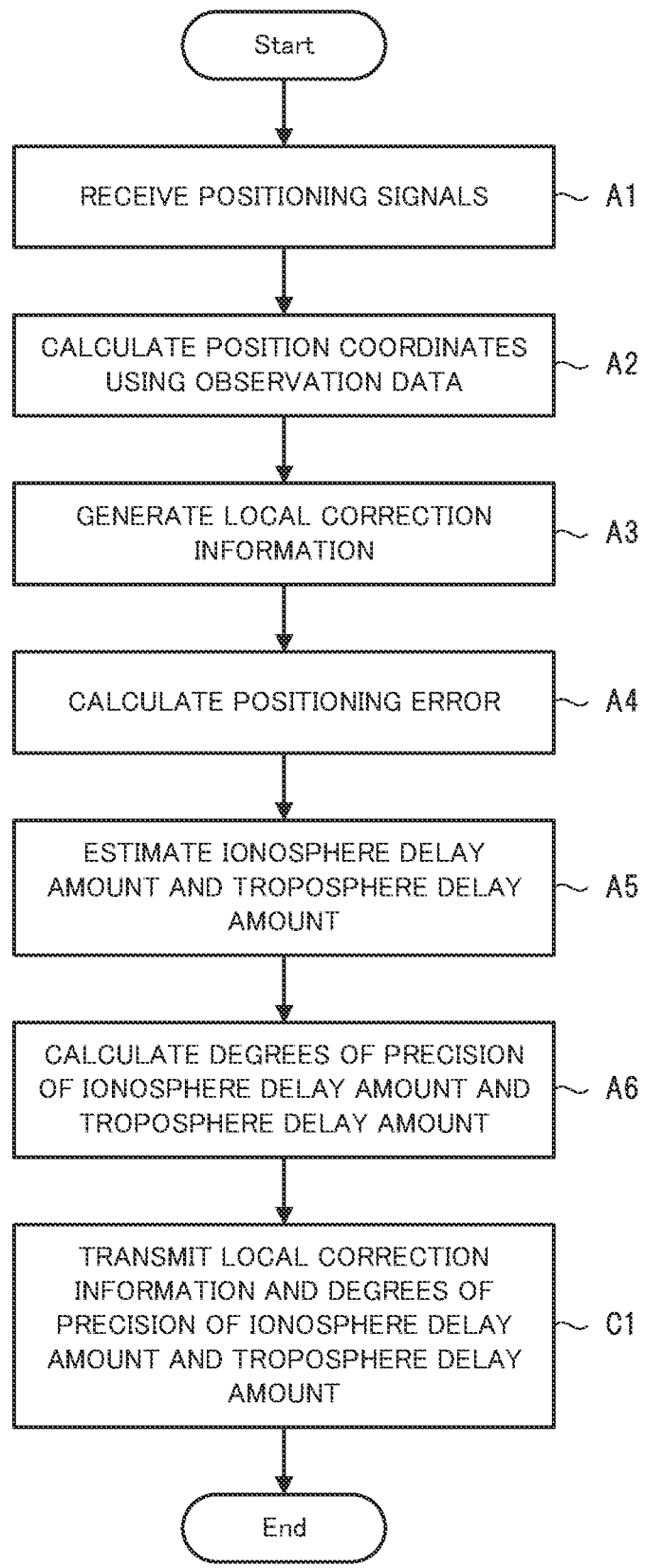
FIG. 6 is a diagram for describing an example of operations of a positioning assistance apparatus of a generation-side apparatus.
Figure 7:
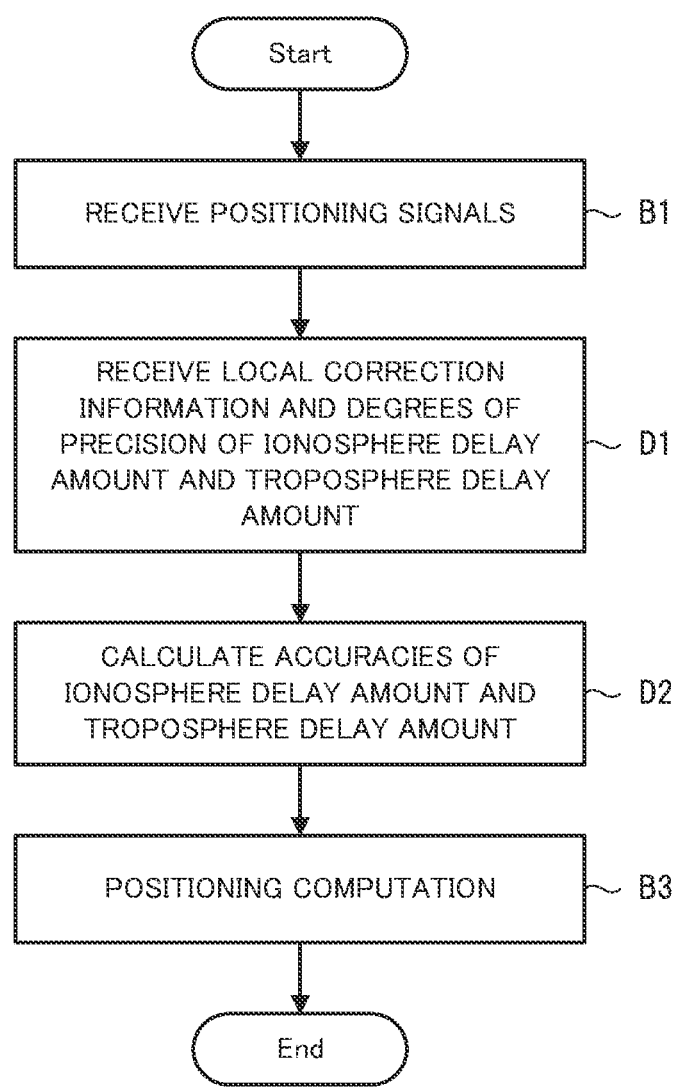
FIG. 7 is a diagram for describing an example of operations of a positioning assistance apparatus of a use-side apparatus.

A program according to the second example embodiment may be a program for causing a generation-side computer to execute steps A1 to A6 and C1 shown in FIG. 6. In addition, the program according to the second example embodiment may be a program for causing a use-side computer to execute steps B1, D1, D2, and B3 shown in FIG. 7.

It is possible to realize the generation-side or use-side positioning assistance apparatus and the positioning assistance method according to the second example embodiment by installing these programs onto the corresponding computers, and executing the programs. In this case, the processor of the generation-side computer functions as the positioning unit 12, the local correction information generation unit 13, the positioning error calculation unit 14, the first estimation unit 2a, the second estimation unit 2b, the first degree-of-precision calculation unit 3a, and the second degree-of-precision calculation unit 3b, and performs processing.

In addition, the processor of the user-side computer functions as the first delay accuracy calculation unit 4a, the second delay accuracy calculation unit 4b, the positioning unit 23, and the control unit 24, and performs processing.

In addition, the program according to the second example embodiment may also be executed by a computer system constituted by a plurality of computers. In this case, for example, each generation-side computer may function as one of the positioning unit 12, the local correction information generation unit 13, the positioning error calculation unit 14, the first estimation unit 2a, the second estimation unit 2b, the first degree-of-precision calculation unit 3a, and the second degree-of-precision calculation unit 3b. Each use-side computer may function as one of the first delay accuracy calculation unit 4a, the second delay accuracy calculation unit 4b, the positioning unit 23, and the control unit 24, for example.

[Physical Configuration]

Figure 8:
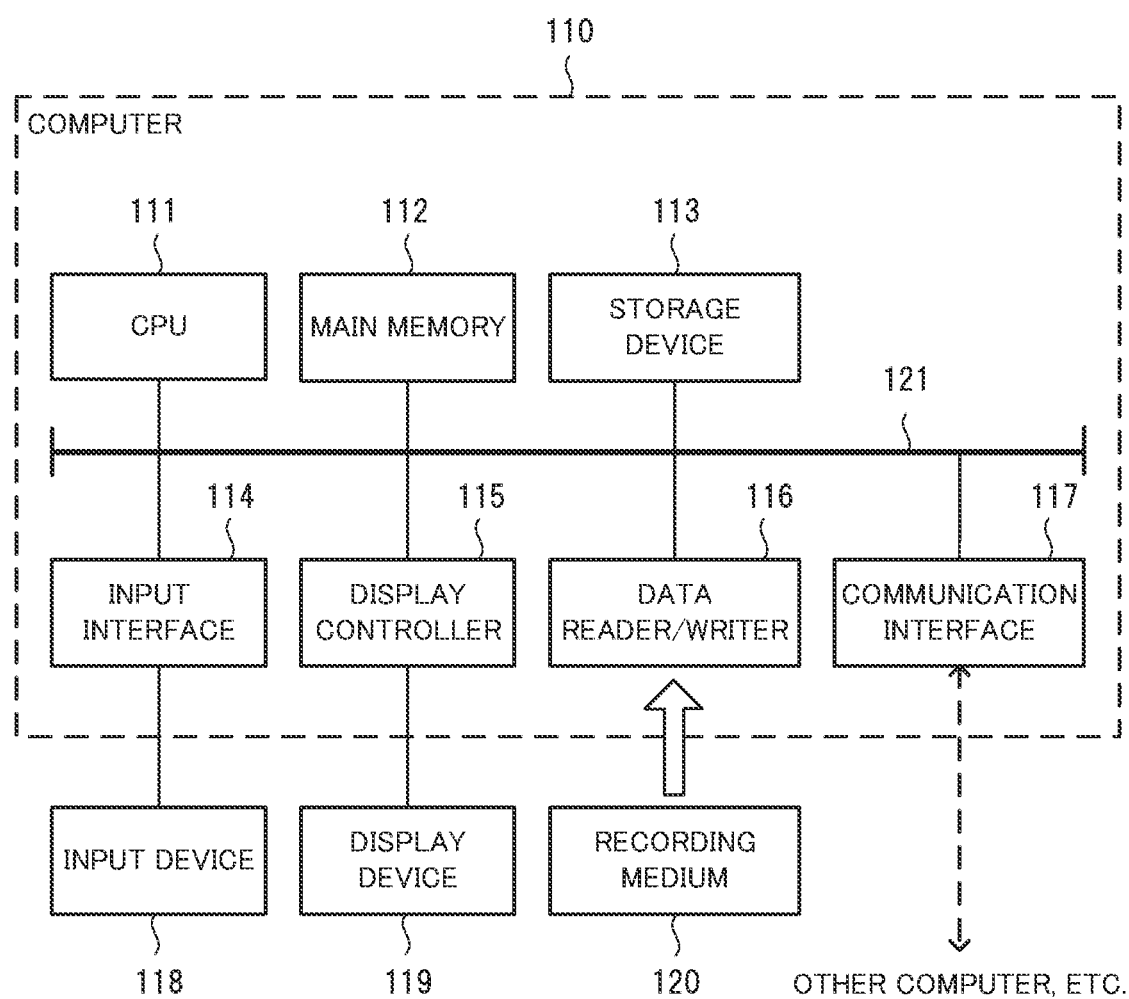
FIG. 8 is a diagram for describing an example of a computer that realizes a positioning assistance apparatus.

Here, a computer that realizes a positioning assistance apparatus by executing the generation-side or use-side program according to the first or second example embodiment will be described with reference to FIG. 8. FIG. 8 is a diagram for describing an example of a computer that realizes a positioning assistance apparatus according to the first or second example embodiment.

As shown in FIG. 8, a computer 110 includes a CPU (Central Processing Unit) 111, a main memory 112, a storage device 113, an input interface 114, a display controller 115, a data reader/writer 116, and a communication interface 117. These units are connected via a bus 121 so as to be able to perform data communication with each other. Note that the computer 110 may include a GPU (Graphics Processing Unit) or a FPGA (Field-Programmable Gate Array) in addition to the CPU 111 or instead of the CPU 111.

The CPU 111 loads a program (codes) according to the present exemplary embodiment stored in the storage device 113 to the main memory 112, and executes them in a predetermined order to perform various kinds of calculations. The main memory 112 is typically a volatile storage device such as a DRAM (Dynamic Random Access Memory). Also, the program according to the present exemplary embodiment is provided in the state of being stored in a computer-readable recording medium 120. Note that the program according to the present exemplary embodiment may be distributed on the Internet that is connected via the communication interface 117.

Specific examples of the storage device 113 include a hard disk drive, and a semiconductor storage device such as a flash memory. The input interface 114 mediates data transmission between the CPU 111 and an input device 118 such as a keyboard or a mouse. The display controller 115 is connected to a display device 119, and controls the display of the display device 119.

The data reader/writer 116 mediates data transmission between the CPU 111 and the recording medium 120, reads out the program from the recording medium 120, and writes the results of processing performed in the computer 110 to the recording medium 120. The communication interface 117 mediates data transmission between the CPU 111 and another computer.

Specific examples of the recording medium 120 include general-purpose semiconductor storage devices such as a CF (Compact Flash (registered trademark)) and a SD (Secure Digital), a magnetic recording medium such as a flexible disk, and an optical recording medium such as a CD-ROM (Compact Disk Read Only Memory).

Supplementary Note

The following supplementary notes are also disclosed in relation to the above-described exemplary embodiments. One or all of the above-described exemplary embodiments can be expressed as, but are not limited to, Supplementary Note 1 to Supplementary Note 18 described below.

(Supplementary Note 1)

A positioning assistance apparatus to be provided in a generation-side apparatus that generates local correction information, the positioning assistance apparatus comprising:
 a first estimation unit that estimates an ionosphere delay amount using an ionosphere delay model generated through machine learning; and
 a first degree-of-precision calculation unit that calculates a first degree of precision with respect to an ionosphere delay amount calculated through positioning computation, using the estimated ionosphere delay amount.

(Supplementary Note 2)

The positioning assistance apparatus according to Supplementary Note 1, further including:
 a second estimation unit that estimates a troposphere delay amount using a troposphere delay model generated through machine learning; and
 a second degree-of-precision calculation unit that calculates a second degree of precision with respect to a troposphere delay amount calculated through positioning computation, using the estimated troposphere delay amount.

(Supplementary Note 3)

The positioning assistance apparatus according to Supplementary Note 1, further comprising:
 a first delay accuracy calculation unit that calculates an accuracy of the ionosphere delay amount using the first degree of precision.

(Supplementary Note 4)

The positioning assistance apparatus according to Supplementary Note 2, further comprising:
 a second delay accuracy calculation unit that calculates an accuracy of the troposphere delay amount using the second degree of precision.

(Supplementary Note 5)

A positioning assistance apparatus to be provided in a use-side apparatus that uses local correction information, the positioning assistance apparatus comprising:
 a first delay accuracy calculation unit that calculates an accuracy of an ionosphere delay amount calculated through positioning computation, based on a first degree of precision calculated using the ionosphere delay amount and an ionosphere delay amount estimated using an ionosphere delay model generated through machine learning.

(Supplementary Note 6)

The positioning assistance apparatus according to Supplementary Note 5, further comprising:
 a second delay accuracy calculation unit that calculates an accuracy of a troposphere delay amount calculated through positioning computation, based on a second degree of precision calculated using the troposphere delay amount and a troposphere delay amount estimated using a troposphere delay model generated through machine learning.

(Supplementary Note 7)

A positioning assistance method for a generation-side apparatus that generates local correction information, the method comprising:
 a first estimating step of estimating an ionosphere delay amount using an ionosphere delay model generated through machine learning; and
 a first degree-of-precision calculation step of calculating a first degree of precision with respect to an ionosphere delay amount calculated through positioning computation, using the estimated ionosphere delay amount.

(Supplementary Note 8)

The positioning assistance method according to Supplementary Note 7, further comprising:
 a second estimating step of estimating a troposphere delay amount using a troposphere delay model generated through machine learning; and
 a second degree-of-precision calculation step of calculating a second degree of precision with respect to a troposphere delay amount calculated through positioning computation, using the estimated troposphere delay amount.

(Supplementary Note 9)

The positioning assistance method according to Supplementary Note 7, further comprising:
 a first delay accuracy calculating step of calculating an accuracy of the ionosphere delay amount using the first degree of precision.

(Supplementary Note 10)

The positioning assistance method according to Supplementary Note 8, further comprising:
 a second delay accuracy calculating step of calculating an accuracy of the troposphere delay amount using the second degree of precision.

(Supplementary Note 11)

A positioning assistance method for a use-side apparatus that uses local correction information, the method comprising:
 a first delay accuracy calculating step of calculating an accuracy of an ionosphere delay amount calculated through positioning computation, based on a first degree of precision calculated using the ionosphere delay amount and an ionosphere delay amount estimated using an ionosphere delay model generated through machine learning.

(Supplementary Note 12)

The positioning assistance method according to Supplementary Note 11, further comprising:
 a second delay accuracy calculating step of calculating an accuracy of a troposphere delay amount calculated through positioning computation, based on a second degree of precision calculated using the troposphere delay amount and a troposphere delay amount estimated using a troposphere delay model generated through machine learning.

(Supplementary Note 13)

A computer-readable recording medium that includes a program recorded thereon, the program including instructions that cause a computer of a generation-side apparatus that generates local correction information to carry out:

a first estimating step of estimating an ionosphere delay amount using an ionosphere delay model generated through machine learning; and a first degree-of-precision calculation step of calculating a first degree of precision with respect to an ionosphere delay amount calculated through positioning computation, using the estimated ionosphere delay amount.

(Supplementary Note 14)

The computer-readable recording medium according to Supplementary Note 13 that includes a program recorded thereon, the program including instructions that cause the computer to carry out:

a second estimating step of estimating a troposphere delay amount using a troposphere delay model generated through machine learning; and a second degree-of-precision calculation step of calculating a second degree of precision with respect to a troposphere delay amount calculated through positioning computation, using the estimated troposphere delay amount.

(Supplementary Note 15)

The computer-readable recording medium according to Supplementary Note 13 that includes a program recorded thereon, the program including instructions that cause the computer to carry out:

a first delay accuracy calculating step of calculating an accuracy of the ionosphere delay amount using the first degree of precision.

(Supplementary Note 16)

The computer-readable recording medium according to Supplementary Note 14 that includes a program recorded thereon, the program including instructions that cause the computer to carry out:

a second delay accuracy calculating step of calculating an accuracy of the troposphere delay amount using the second degree of precision.

(Supplementary Note 17)

A computer-readable recording medium that includes a program recorded thereon, the program including instructions that cause a computer of a use-side apparatus that uses local correction information to carry out:

a first delay accuracy calculating step of calculating an accuracy of an ionosphere delay amount calculated through positioning computation, based on a first degree of precision calculated using the ionosphere delay amount and an ionosphere delay amount estimated using an ionosphere delay model generated through machine learning.

(Supplementary Note 18)

The computer-readable recording medium according to Supplementary Note 17 that includes a program recorded thereon, the program including instructions that cause the computer to carry out:

a second delay accuracy calculating step of calculating an accuracy of a troposphere delay amount calculated through positioning computation, based on a second degree of precision calculated using the troposphere delay amount and a troposphere delay amount estimated using a troposphere delay model generated through machine learning.

Although the invention has been described above with reference to the example embodiments above, the invention is not limited to the above example embodiments. Various modifications understandable to a person skilled in the art can be made to configurations and details of the invention, within the scope of the invention.

This application is based upon and claims the benefit of priority from Japanese Patent Application No. 2019-162454, filed Sep. 5, 2019, the disclosure of which is incorporated herein in its entirety by reference.

INDUSTRIAL APPLICABILITY

As described above, according to the invention, it is possible to improve the positioning accuracy. The invention is useful in a technical field in which positioning needs to be performed using a satellite positioning system.

LIST OF REFERENCE SIGNS

1 Positioning assistance apparatus
2 Estimation unit
2a First estimation unit
2b Second estimation unit
3 Degree-of-precision calculation unit
3a First degree-of-precision calculation unit
3b Second-degree-of-precision calculation unit
Delay accuracy calculation unit
4a First delay accuracy calculation unit
4b Second delay accuracy calculation unit
10 Generation-side apparatus
11 Positioning signal receiving unit
12 Positioning unit
13 Local correction information generation unit
14 Positioning error calculation unit
15 Communication unit
20 Use-side apparatus
21 Positioning signal receiving unit
22 Communication unit
23 Positioning unit
24 Control unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A generation-side apparatus comprising:
an antenna for receiving positioning signals from one or more positioning satellites;
a processor; and
a memory storing instructions executable by the processor to:
determine a reference position of the generation-side apparatus;
calculate an estimated position of the generation-side apparatus based on the positioning signals received from the one or more positioning satellites;
calculate a positioning error between the reference position and the estimated position;
calculate a calculated ionosphere delay amount at a time when the estimated position is calculated;

generate local correction information for the one or more positioning satellites, the local correction information including the calculated ionosphere delay amount;

receive a current temperature and humidity;

determine an estimated ionosphere delay amount using an ionosphere delay model generated through machine learning, based on the positioning error and the current temperature and humidity;

calculate a first degree of precision of the calculated ionosphere delay amount using the estimated ionosphere delay amount;

calculate an accuracy of the calculated ionosphere delay amount using the first degree of precision; and transmit the local correction information and the accuracy of the calculated ionosphere delay amount included in the local correction information to a use-side apparatus, the use-side apparatus using the local correction information and the accuracy of the calculated ionosphere delay amount included in the local correction information to determine a position of the use-side apparatus based on positioning signals that the use-side apparatus receives from the one or more positioning satellites.

2. The generation-side apparatus according to claim 1, wherein the instructions are executable by the processor to further:

calculate a calculated troposphere delay amount at the time when the estimated position is calculated, the local correction information further including the calculated troposphere delay amount;

determine an estimated troposphere delay amount using a troposphere delay model generated through machine learning, based on at least the positioning error;

calculate a second degree of precision of the calculated troposphere delay amount, using the estimated troposphere delay amount;

calculate an accuracy of the calculated troposphere delay amount using the second degree of precision; and transmit the accuracy of the calculated troposphere delay amount included in the local correction information to the use-side apparatus, the use-side apparatus further using the accuracy of the calculated troposphere delay amount included in the local correction information to determine the position of the use-side apparatus.

3. A use-side apparatus comprising:

an antenna for receiving positioning signals from one or more positioning satellites;

a processor; and a memory storing instructions executable by the processor to:

receive local correction information for the one or more positioning satellites including a calculated ionosphere delay amount, and an accuracy of the calculated ionosphere delay amount, from a generation-side apparatus;

determine a position of the use-side apparatus based on the positioning signals received from the one or more positioning satellites, using the local correction information and the accuracy of the calculated ionosphere delay amount included in the local correction information, wherein the generation-side apparatus generates the local correction information and calculates the accuracy of the calculated ionosphere delay amount by:

determining a reference position of the generation-side apparatus;

calculating an estimated position of the generation-side apparatus based on positioning signals received by an antenna of the generation-side apparatus from the one or more positioning satellites;

calculating a positioning error between the reference position and the estimated position;

calculating the calculated ionosphere delay amount at a time when the estimated position is calculated;

generating the local correction information for the one or more positioning satellites, the local correction information including the calculated ionosphere delay amount;

receiving a current temperature and humidity;

determining an estimated ionosphere delay amount using an ionosphere delay model generated through machine learning, based on the positioning error and the current temperature and humidity;

calculating a first degree of precision of the calculated ionosphere delay amount using the estimated ionosphere delay amount; and calculating an accuracy of the calculated ionosphere delay amount using the first degree of precision.

4. The use-side apparatus according to claim 3, wherein the instructions are executable by the processor to further:

receive an accuracy of a calculated troposphere delay amount from the generation-side apparatus, the local correction information further including the calculated troposphere delay amount; and determine the position of the use-side apparatus, further using the accuracy of the calculated troposphere delay amount included in the local correction information, wherein the generation-side apparatus calculates the accuracy of the calculated troposphere delay amount by:

calculating the calculated troposphere delay amount at the time when the estimated position is calculated, the local correction information further including the calculated troposphere delay amount;

determining an estimated troposphere delay amount using a troposphere delay model generated through machine learning, based on at least the positioning error;

calculating a second degree of precision of the calculated troposphere delay amount, using the estimated troposphere delay amount; and calculating accuracy of the calculated troposphere delay amount using the second degree of precision.

5. A method performed by a generation-side apparatus, the method comprising:

determining a reference position of the generation-side apparatus;

calculating an estimated position of the generation-side apparatus based on positioning signals received by an antenna of the generation-side apparatus from one or more positioning satellites;

calculating a positioning error between the reference position and the estimated position;

calculate a calculated ionosphere delay amount at a time when the estimated position is calculated;

generating local correction information for the one or more positioning satellites, the local correction information including the calculated ionosphere delay amount;

receiving a current temperature and humidity;

determining an estimated ionosphere delay amount using an ionosphere delay model generated through machine learning, based on the positioning error and the current temperature and humidity;

calculating a first degree of precision of the calculated ionosphere delay amount using the estimated ionosphere delay amount;

calculating an accuracy of the calculated ionosphere delay amount using the first degree of precision; and transmitting the local correction information and the accuracy of the calculated ionosphere delay amount included in the local correction information to a use-side apparatus, the use-side apparatus using the local correction information and the accuracy of the calculated ionosphere delay amount included in the local correction information to determine a position of the use-side apparatus based on positioning signals that the use-side apparatus receives from the one or more positioning satellites.

6. The method according to claim 5, further comprising:

calculating a calculated troposphere delay amount at the time when the estimated position is calculated, the local correction information further including the calculated troposphere delay amount;

determining an estimated troposphere delay amount using a troposphere delay model generated through machine learning, based on at least the positioning error;

calculating a second degree of precision of the calculated troposphere delay amount, using the estimated troposphere delay amount;

calculating an accuracy of the calculated troposphere delay amount using the second degree of precision; and transmitting the accuracy of the calculated troposphere delay amount included in the local correction information to the use-side apparatus, the use-side apparatus further using the accuracy of the calculated troposphere delay amount included in the local correction information to determine the position of the use-side apparatus.

7. A method performed by a use-side apparatus, the method comprising:

receiving local correction information for one or more positioning satellites including a calculated ionosphere delay amount, and an accuracy of the calculated ionosphere delay amount, from a generation-side apparatus;

determine a position of the use-side apparatus based on positioning signals received by an antenna of the use-side apparatus from the one or more positioning satellites, using the local correction information and the accuracy of the calculated ionosphere delay amount included in the local correction information, wherein the generation-side apparatus generates the local correction information and calculates the accuracy of the calculated ionosphere delay amount by:

determining a reference position of the generation-side apparatus;

calculating an estimated position of the generation-side apparatus based on positioning signals received by an antenna of the generation-side apparatus from the one or more positioning satellites;

calculating a positioning error between the reference position and the estimated position;

calculating the calculated ionosphere delay amount at a time when the estimated position is calculated;

generating the local correction information for the one or more positioning satellites, the local correction information including the calculated ionosphere delay amount;

receiving a current temperature and humidity;

determining an estimated ionosphere delay amount using an ionosphere delay model generated through machine learning, based on the positioning error and the current temperature and humidity;

calculating a first degree of precision of the calculated ionosphere delay amount using the estimated ionosphere delay amount; and calculating an accuracy of the calculated ionosphere delay amount using the first degree of precision.

8. The method according to claim 7, further comprising:

receiving an accuracy of a calculated troposphere delay amount from the generation-side apparatus, the local correction information further including the calculated troposphere delay amount; and determining the position of the use-side apparatus, further using the accuracy of the calculated troposphere delay amount included in the local correction information, wherein the generation-side apparatus calculates the accuracy of the calculated troposphere delay amount by:

calculating the calculated troposphere delay amount at the time when the estimated position is calculated, the local correction information further including the calculated troposphere delay amount;

determining an estimated troposphere delay amount using a troposphere delay model generated through machine learning, based on at least the positioning error;

calculating a second degree of precision of the calculated troposphere delay amount, using the estimated troposphere delay amount; and calculating accuracy of the calculated troposphere delay amount using the second degree of precision.

9. A non-transitory computer-readable recording medium storing a program executable by a generation-side apparatus to perform processing comprising:

determining a reference position of the generation-side apparatus;

calculating an estimated position of the generation-side apparatus based on positioning signals received by an antenna of the generation-side apparatus from one or more positioning satellites;

calculating a positioning error between the reference position and the estimated position;

calculate a calculated ionosphere delay amount at a time when the estimated position is calculated;

generating local correction information for the one or more positioning satellites, the local correction information including the calculated ionosphere delay amount;

receiving a current temperature and humidity;

determining an estimated ionosphere delay amount using an ionosphere delay model generated through machine learning, based on the positioning error and the current temperature and humidity;

calculating a first degree of precision of the calculated ionosphere delay amount using the estimated ionosphere delay amount;

calculating an accuracy of the calculated ionosphere delay amount using the first degree of precision; and transmitting the local correction information and the accuracy of the calculated ionosphere delay amount included in the local correction information to a use-side apparatus, the use-side apparatus using the local correction information and the accuracy of the calculated ionosphere delay amount included in the local correction information to determine a position of the use-side apparatus based on positioning signals that the use-side apparatus receives from the one or more positioning satellites.

10. The non-transitory computer-readable recording medium according to claim 9, wherein the processing further comprises:
calculating a calculated troposphere delay amount at the time when the estimated position is calculated, the local correction information further including the calculated troposphere delay amount;
determining an estimated troposphere delay amount using a troposphere delay model generated through machine learning, based on at least the positioning error;
calculating a second degree of precision of the calculated troposphere delay amount, using the estimated troposphere delay amount;
calculating an accuracy of the calculated troposphere delay amount using the second degree of precision; and
transmitting the accuracy of the calculated troposphere delay amount included in the local correction information to the use-side apparatus, the use-side apparatus further using the accuracy of the calculated troposphere delay amount included in the local correction information to determine the position of the use-side apparatus.

11. A non-transitory computer-readable recording medium storing a program executable by a use-side apparatus to perform processing comprising:
receiving local correction information for one or more positioning satellites including a calculated ionosphere delay amount, and an accuracy of the calculated ionosphere delay amount, from a generation-side apparatus;
determine a position of the use-side apparatus based on positioning signals received by an antenna of the use-side apparatus from the one or more positioning satellites, using the local correction information and the accuracy of the calculated ionosphere delay amount included in the local correction information, wherein
the generation-side apparatus generates the local correction information and calculates the accuracy of the calculated ionosphere delay amount by:
determining a reference position of the generation-side apparatus;
calculating an estimated position of the generation-side apparatus based on positioning signals received by an antenna of the generation-side apparatus from the one or more positioning satellites;
calculating a positioning error between the reference position and the estimated position;
calculating the calculated ionosphere delay amount at a time when the estimated position is calculated;
generating the local correction information for the one or more positioning satellites, the local correction information including the calculated ionosphere delay amount;
receiving a current temperature and humidity;
determining an estimated ionosphere delay amount using an ionosphere delay model generated through machine learning, based on the positioning error and the current temperature and humidity;
calculating a first degree of precision of the calculated ionosphere delay amount using the estimated ionosphere delay amount; and
calculating an accuracy of the calculated ionosphere delay amount using the first degree of precision.

12. The non-transitory computer-readable recording medium according to claim 11, wherein the processing further comprises:
receiving an accuracy of a calculated troposphere delay amount from the generation-side apparatus, the local correction information further including the calculated troposphere delay amount; and
determining the position of the use-side apparatus, further using the accuracy of the calculated troposphere delay amount included in the local correction information, wherein
the generation-side apparatus calculates the accuracy of the calculated troposphere delay amount by:
calculating the calculated troposphere delay amount at the time when the estimated position is calculated, the local correction information further including the calculated troposphere delay amount;
determining an estimated troposphere delay amount using a troposphere delay model generated through machine learning, based on at least the positioning error;
calculating a second degree of precision of the calculated troposphere delay amount, using the estimated troposphere delay amount; and
calculating accuracy of the calculated troposphere delay amount using the second degree of precision.

* * * * *